Jan. 21, 1969 I. J. HIRST 3,423,690
TERMINATING NETWORK FOR A NEGATIVE FEEDBACK AMPLIFIER
Filed March 25, 1966
Fig. 1 PRIOR ART
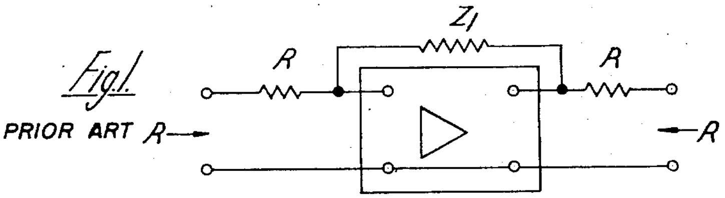
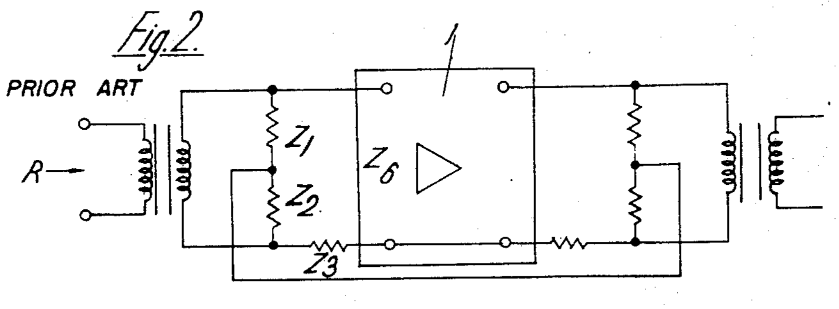
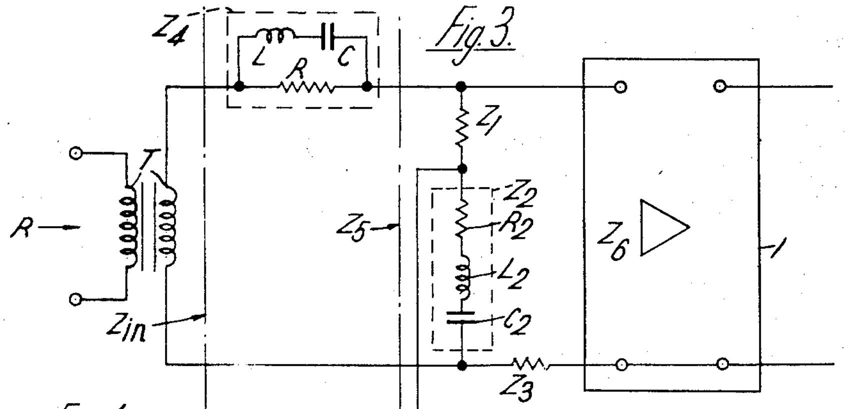
Fig. 4
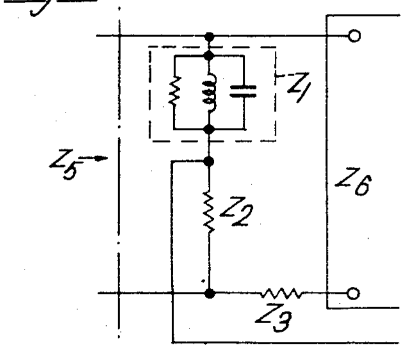
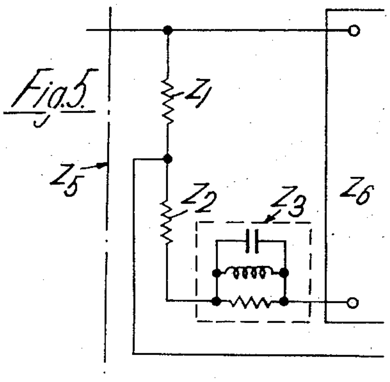

United States Patent Office 3,423,690

Patented Jan. 21, 1969

3,423,690
TERMINATING NETWORK FOR A NEGATIVE FEEDBACK AMPLIFIER

Ian Johnson Hirst, London, England, assignor to International Standard Electric Corporation, New York, N.Y., a corporation of Delaware Filed Mar. 25, 1966, Ser. No. 537,382
Claims priority, application Great Britain, Apr. 9, 1965, 15,237/65
U.S. Cl. 330—109 6 Claims
Int. Cl. H03g 3/30

ABSTRACT OF THE DISCLOSURE

A terminating network is provided for a negative feedback amplifier. The network includes a reactance circuit connected between a source of signals and an input terminal of the amplifier. A bridge circuit is connected across the input terminals of the amplifier so that the amplifier forms one arm of the bridge. Another arm of the bridge contains a network which is resonant at the same frequency as the reactance circuit. The result is a terminating network which presents a substantially constant input impedance over a wide frequency range while enabling the supply of a large feedback to the amplifier and maintaining noise and overload performance of the amplifier at a high level.

This invention relates to negative feedback amplifiers and in particular to terminating networks for such amplifiers.

In high quality transmission circuits for broadband signals it is important that the input and output circuits of line amplifiers present a good termination to the lines to which they are connected. Since negative feedback modifies the input and/or the output impedances of the amplifier the problem arises to provide amplifier terminating networks which are efficient and allow a maximum amount of feedback to be used.

Of the various known circuits used to terminate a negative feedback amplifier two will be mentioned.

In one the amplifier input and/or output impedances are made either very low or very high by applying shunt or series feedback. A resistor of the required value is then connected in series or in parallel with the amplifier terminals to provide the termination.

In the other circuit shunt and series feedback are applied simultaneously by means of a bridge circuit and produce at the terminals of the amplifier terminations of the required value without actually using a terminating resistor as in the first circuit. However each of these terminating circuits suffers from specific disadvantages which will be discussed later.

The present invention aims at overcoming these disadvantages. In accordance with the invention there is provided a terminating network for a negative feedback amplifier comprising at least one bridge circuit having a first diagonal connected to a source of signals to be amplified or to a load circuit via a first reactance network and a second diagonal forming part of the feedback circuit, one arm of said bridge circuit comprising a second reactance network so chosen that the impedance presented by said first diagonal is conjugate to the impedance of said first reactance network.

The invention will now be described with reference to the accompanying drawings in which FIGS. 1 and 2 show known circuits for providing amplifier terminations and FIG. 3 shows an amplifier terminating circuit according to one embodiment of the invention.

FIGS. 4 and 5 are modifications of the circuit of FIG. 3.

In the terminating arrangement shown in FIG. 1 the amplifier 1 is provided with shunt feedback by means of impedance $Z_1$ which reduces the impedances at the amplifier terminals to a low value. If a resistor R is connected in series with the amplifier terminals, the impedance which will be seen by the source or load circuit connected to the amplifier will also be R. Similarly if series feedback were used, the impedance at the amplifier terminals would be very high and in order to present to a source or a load circuit a resistance R, a resistor of that value must be connected in shunt with the amplifier.

In both these methods the terminations are provided by physical resistors. It is clear therefore that in order to deliver a given amount of power to a load circuit an equal amount of power is dissipated in the terminating resistor R. Therefore the overload performance of the amplifier is degraded by 3 db. It will also be clear that the noise performance of the amplifier is degraded by the same amount. These are serious disadvantages particularly in high grade telecommunication circuits. The above methods have however the advantage that a maximum amount of feedback can be applied to the amplifier.

In the circuit of FIG. 2 the amplifier is provided with shunt and series feedback by means of bridge circuits connected to its input and output circuits. In this case no physical terminating resistors are used, the desired value of termination being obtained by an appropriate choice of impedances $Z_1$, $Z_2$ and $Z_3$ forming part of the bridge circuit. The value of these impedances is such that they dissipate only a small amount of power. For this reason the noise and overload performance of this circuit is 3 db better than for circuits using physical terminations. It is known however that with bridge feedback only a limited amount of negative feedback can be applied. Also because bridge networks are essentially two-path networks and because transformers are known to have spurious resonances, there is the danger that the bridge may become a non-minimum phaseshift network and will interfere with the operation of the feedback circuit.

In order to compensate for a rising loss-frequency characteristic of cables, amplifiers in repeaters for telecommunication systems are usually given a rising gain-frequency characteristic by including in the feedback path a reactance network which alters the amount of feedback applied. For simplicity this network is not shown in FIGS. 2 to 5 of the drawings.

Amplifiers having rising gain frequency characteristics should combine good overload and noise performance at a frequency corresponding to maximum gain with the ability to provide sufficient feedback at the lowest frequency to be transmitted. This amounts to a requirement, that the circuit used should have the advantages of the circuits of FIGS. 1 and 2, but none of the disadvantages.

The way in which this is achieved will be explained by reference to FIG. 3 in which for simplicity only the input circuit of the amplifier is shown. The output circuit may be either identical or arranged to give a different value of terminating impedance.

The amplifier input circuit of FIG. 3 is essentially a bridge network having arms $Z_1$, $Z_2$, $Z_3$ and $Z_6$. One diagonal of this bridge is connected to the source of signals to be amplified via an impedance $Z_4$ and input transformer T. Negative feedback is applied to the other diagonal. Bridge arm $Z_2$ is a reactance network comprising $R_2$, $L_2$ and $C_2$ connected in series. Impedance $Z_4$ which is connected between the bridge and the transformer is a resistor R shunted by a series resonant circuit L, C.

If the reactances of $Z_2$ and $Z_4$ are chosen to resonate at the same frequency, it is seen that at resonance the circuit of FIG. 3 becomes that of FIG. 2 i.e. a conventional bridge feedback network.

From the figure it is seen that the amplifier input impedance $$Z_{in}=Z_4+Z_5 \quad (1)$$

Thus if at all frequencies the amplifier input impedance is to equal to resistance R impedances $Z_4$ and $Z_5$ must add to a constant resistance i.e.

$$R=Z_4+Z_5 \therefore Z_5=R-Z_4 \quad (2)$$

Therefore $$Z_5=R-\frac{R\left(jwL+\frac{1}{jwc}\right)}{R+jwL+\frac{1}{jwc}}=\frac{R^2}{R+jwl}+\frac{1}{jwc} \quad (3)$$

The admittance of $Z_5$ is $$Y_5=\frac{1}{R}+jw\frac{L}{R^2}+\frac{1}{jwcR^2} \quad (4)$$

which defines a network comprising a resistor of magnitude R, an inductor of magnitude $CR^2$ and a capacitor of magnitude $L/R^2$ connected in parallel.

$Y_5$ is the input admittance of an amplifier using bridge feedback and provided sufficient feedback is used can be expressed in terms of the bridge impedances $$Y_5=\frac{Z_2}{Z_1Z_3} \quad (5)$$

This admittance can be synthesized by making two of the bridge arms, for example $Z_1$ and $Z_3$ resistive and make the third arm frequency dependent $$Z_2=Y_5\cdot Z_1\cdot Z_3=R_1R_3\left(\frac{1}{R}+jw\frac{L}{R^2}+\frac{1}{jwR^2}\right)$$

$$Z_2=\frac{R_1R_3}{R}+\frac{jwR_1R_3}{R^2}+\frac{R_1R_3}{jwCR^2} \quad (6)$$

This expression represents a network comprising a resistor of value $$\frac{R_1R_3}{R}$$

and inductor of value $$\frac{LR_1R_3}{R^2}$$

and a capacitor of value $$\frac{CR^2}{R_1R_3}$$

connected in series.

Although in the above example $Z_2$ was made the frequency dependent arm, $Z_1$ or $Z_3$ could have been selected equally well. These alternative arrangements are shown in FIGS. 4 and 5. The element values of these networks are determined in a way similar to the above, the elements being arranged as parallel resonant circuits.

It is to be understood that the foregoing description of specific examples of this invention is made by way of example only and is not to be considered as a limitation on its scope.

What I claim is:

1. A terminating network for a negative feedback amplifier comprising:

first and second terminals for coupling to a source of signals,
a bridge circuit,
means including a first reactance network for connecting a first arm of said bridge circuit to said first terminal,
means for connecting said first arm by a third terminal to a negative feedback loop,
said first arm including a resistor,
means for connecting a second arm of said bridge between said third terminal and said second terminal,
said second arm incorporating a second reactance network, and
said first reactance network forming a series resonant circuit having substantially zero impedance at the resonant frequency.

2. A terminating network as claimed in claim 1, in which:
the second reactance network forms a series resonant circuit having a resistance at the resonent frequency substantially equal to that of the resistor in the first arm.

3. A terminating network as claimed in claim 1, in which:
the first arm includes a network formed by a resistor, an inductor and a capacitor in parallel and the second reactance network is a fixed resistance.

4. A terminating network as claimed in claim 1, in which:
a third arm of said bridge circuit is connected between said second terminal and an input terminal of a feedback amplifier,
the second reactance network is substantially a fixed resistance, and
the third arm includes a network formed by a resistor, an inductor and a capacitor in parallel.

5. A terminating network for a negative feedback amplifier comprising:
a bridge circuit having a substantially pure fixed resistance in two arms, a first impedance in a third arm and input terminals of a negative feedback amplifier in a fourth arm, and
means including a second impedance for coupling said bridge circuit to a source of signals,
said second impedance including a series resonant circuit having substantially zero impedance at the resonant frequency.

6. A terminating network substantially as claimed in claim 5, in which:
the first impedance is a circuit which resonates at the resonant frequency of the second impedance.

References Cited

UNITED STATES PATENTS

| | | | |
|---|---|---|---|
| 1,993,758 | 3/1935 | Stillwell | 330—109 X |
| 2,033,963 | 3/1936 | Ware | 330—146 X |
| 2,241,925 | 5/1941 | Roche | 330—146 X |

ROY LAKE, *Primary Examiner.*

J. B. MULLINS, *Assistant Examiner.*

U.S. Cl. X.R.

330—146, 175